Dec. 8, 1953   J. F. STIPEK   2,661,651
PROJECTION OF STEREOSCOPIC PICTURES
Filed July 22, 1949                           4 Sheets-Sheet 1
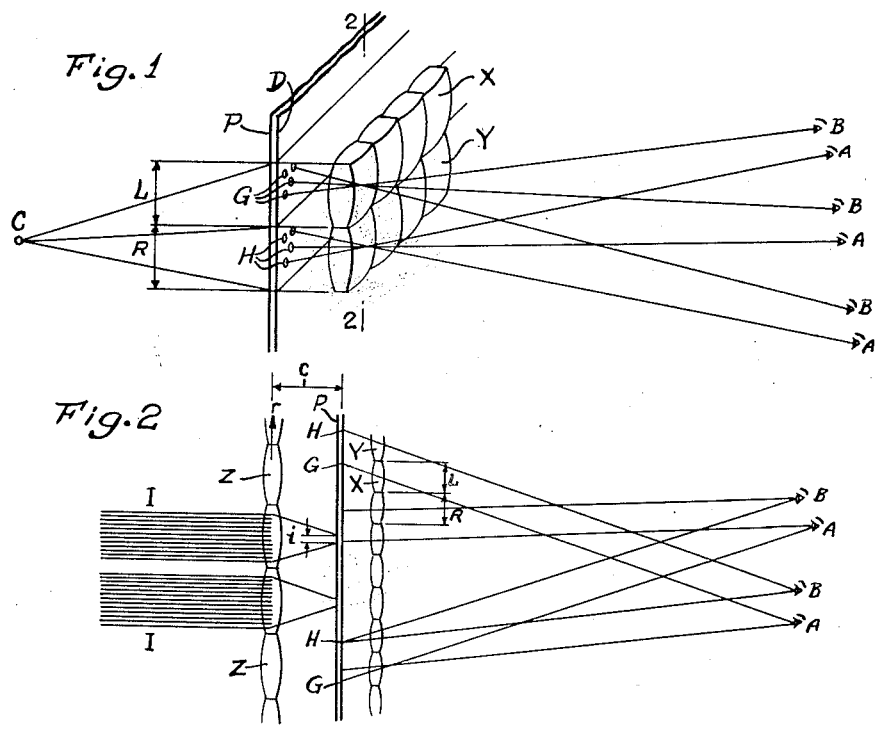
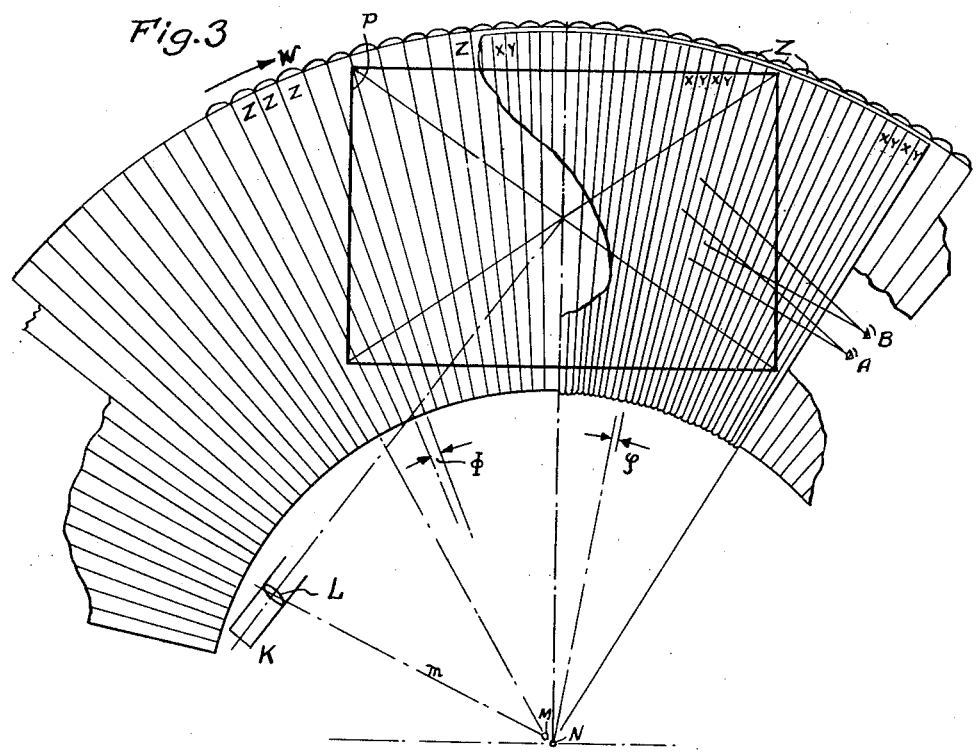

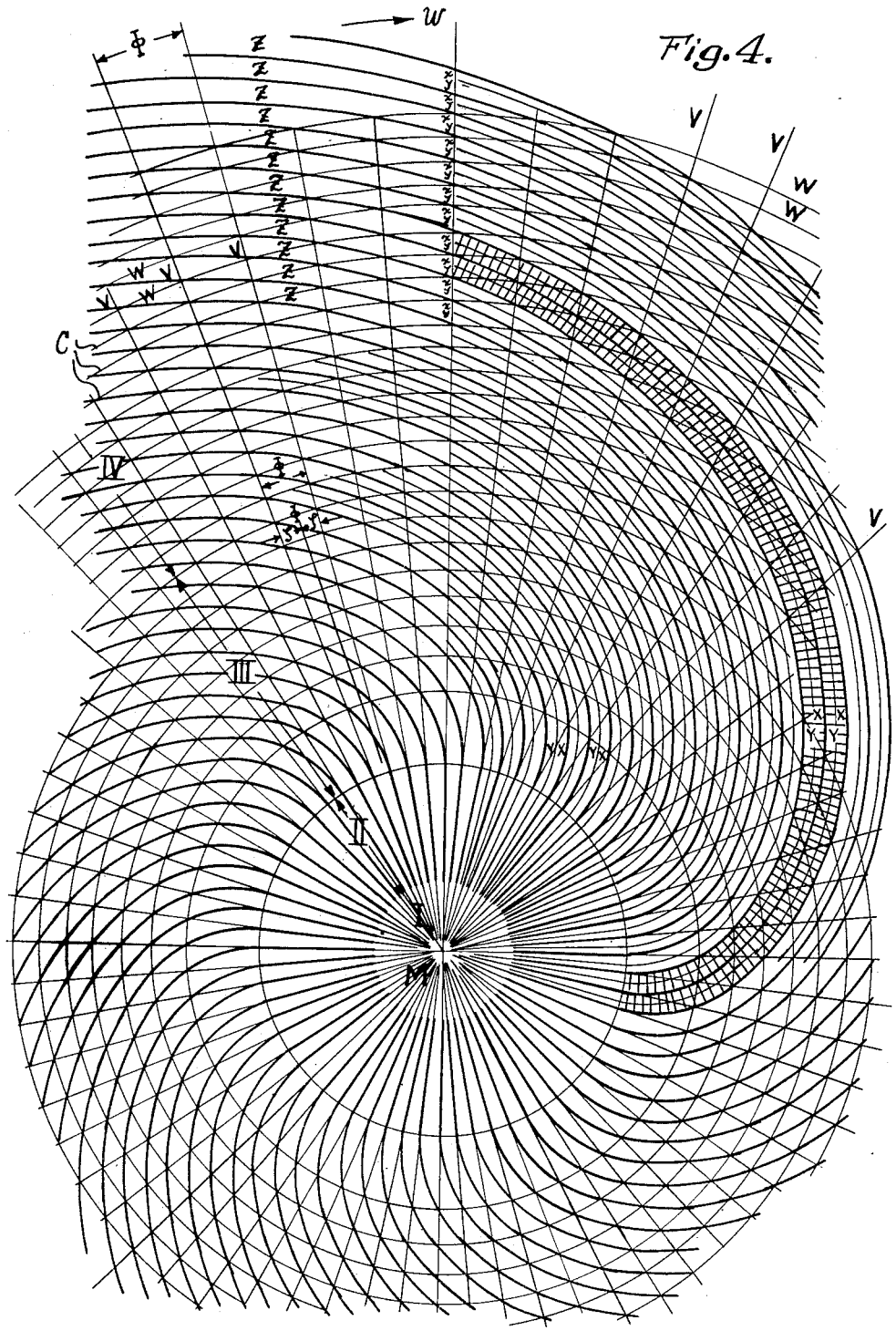

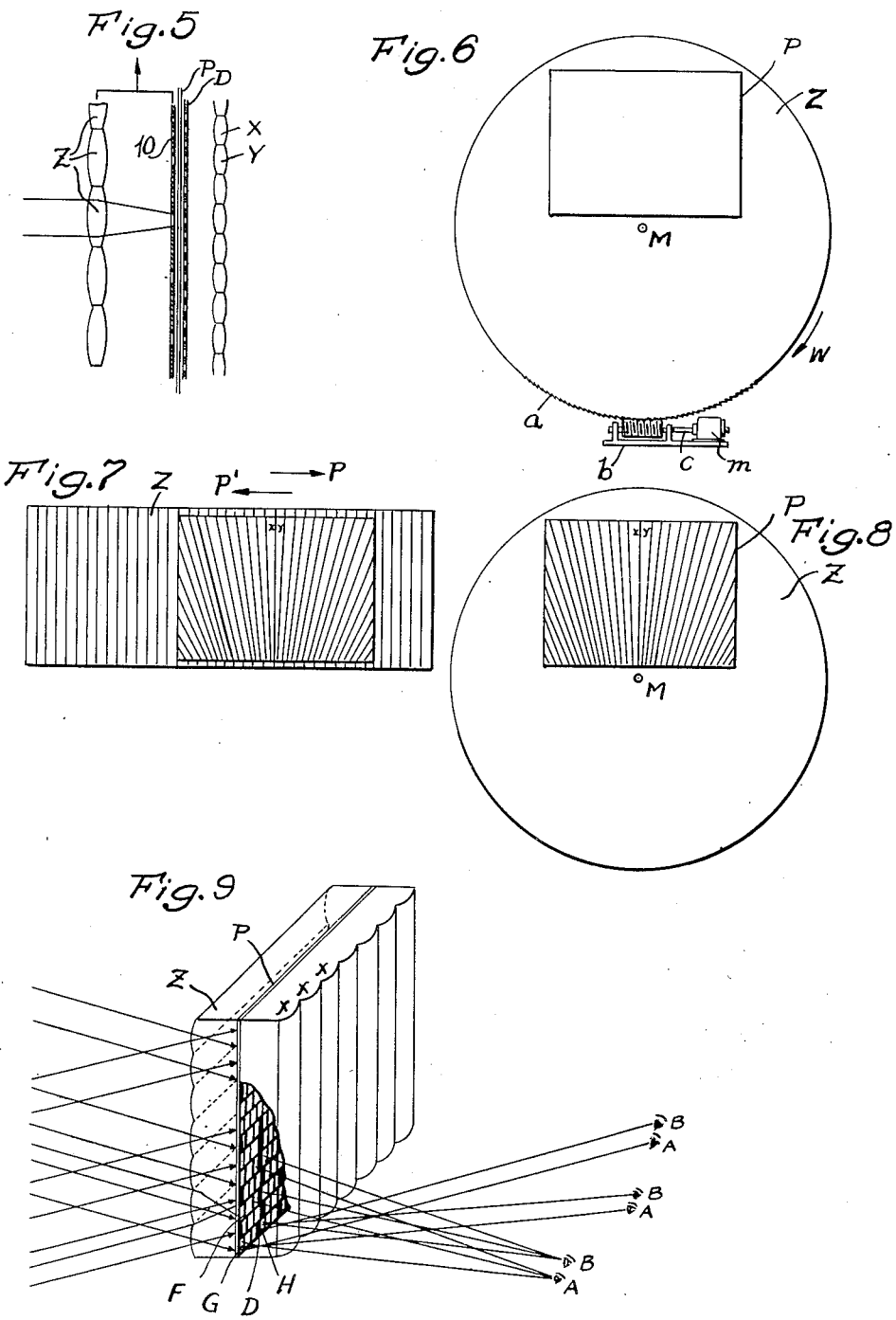

Patented Dec. 8, 1953

2,661,651

UNITED STATES PATENT OFFICE 2,661,651

PROJECTION OF STEREOSCOPIC PICTURES

Johann Franz Stipek, Vienna, Austria

Application July 22, 1949, Serial No. 106,136

6 Claims. (Cl. 88—16.6)

1

The invention relates to the reproduction of stereoscopically taken right eye- and left eye-pictures with a three-dimensional relief effect on a two-dimensional screen by means of non-polarized light.

It is a main object of the invention to provide a process for the reproduction of such pictures.

It is another important object of the invention to provide a device for the reproduction of such pictures.

It is still another object of the invention to provide a method of producing some main components of the device for the reproduction of such pictures.

According to a main feature of the invention a process for the three-dimensional reproduction of stereoscopically taken right eye- and left eye-pictures by means of non-polarized light on a two-dimensional screen comprises the steps of projecting right eye- and left eye-pictures alternately on to a grid of condenser lenses from the rear, focussing said pictures separately on different areas of a ligh-permeable screen, and uncovering the areas illuminated by light from the right eye-pictures to the right eyes only, and the areas illuminated by light from the left eye-pictures to the left eyes only, of the spectators, while otherwise covering the said screen from vision on the side of the spectators.

A device according to the invention preferably comprises, in combination, a grid of condenser lenses arranged so as to be projected from the rear alternately with right eye- and left eye-pictures, a light-permeable screen arranged in front of the said grid at a distance equal to the focal length of said condenser lenses, an opaque blind in front of the said screen having separate zones of light-permeable areas arranged so as to be alternately illuminated by the light from the right eye- and left eye-pictures, respectively, and optical means arranged in front of said blind adapted to direct the light from the said zones for the purpose of being illuminated by right eye-pictures and by left eye-pictures, respectively, to the loci of the right eyes only and of the left eyes only, respective, of the spectators.

Other objects and features of the invention will become apparent from the following description of the invention by way of example with reference to the accompanying drawings, in which:

Fig. 1 shows diagrammatically a perspective view of the arrangement of one embodiment of a device according to the invention relatively to a number of spectators.

Fig. 2 is a section along the line 2—2 of Fig. 1,

2 showing the same arrangement on a smaller scale.

Fig. 3 is a view, partly in elevation, showing diagrammatically another embodiment of the invention.

Fig. 4 is a front elevation on a larger scale showing diagrammatically a modification of this embodiment.

Fig. 5 shows a modification of the embodiment according to Figs. 3 and 4 in a sectional plan view similar to Fig. 2.

Fig. 6, Fig. 7 and Fig. 8 diagrammatically show details of modifications of the embodiments according to Figs. 3 and 4 on a smaller scale.

Fig. 9 diagrammatically shows in perspective another modification of the invention.

Figure 10:
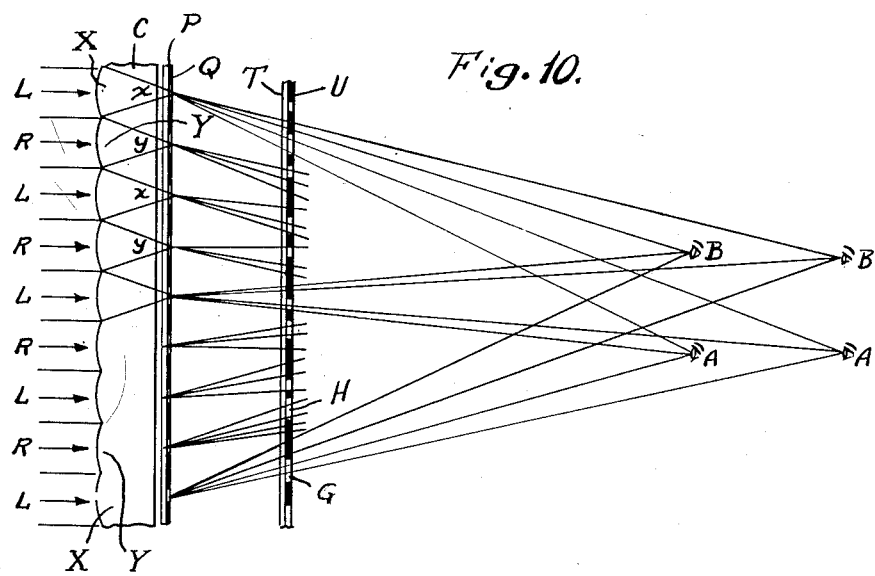

Fig. 10 diagrammatically shows in sectional plan view still another embodiment of the invention.

Figure 11:
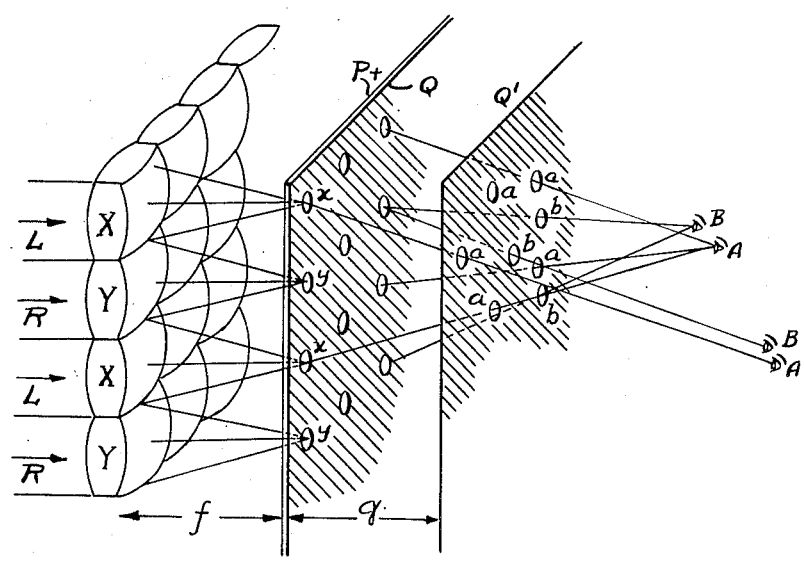

Fig. 11 diagrammatically shows in perspective view still another embodiment of the invention.

Referring first to Figs. 1 and 2, C denotes a projector, P a translucent projection screen, D a blind layer, impermeable to light, arranged in front of the screen P on the side of the spectators and having small openings G as light-permeable areas for the left eyes A, and small openings H as light-permeable areas for the right eyes B of the spectators, these openings G and H being arranged in separate zones L and R respectively. Rows of observation lenses X which are also arranged in front of the screen P are coordinated to the openings G, and rows of observation lenses Y are likewise coordinated to the openings H. Behind the projection screen P there is arranged a grid of condenser lenses Z (Fig. 2) arranged at a distance $c$ from said screen corresponding to their focal length, which grid of condenser lenses throws separate bundles of light rays (light areas) on to the projection screen P. One cylindrically or conically shaped lens Z is coordinated with a pair of observation lenses X—Y.

In Fig. 2 the narrow strips of light thrown on to the screen P by the light bundles I through the condenser lenses Z are indicated at $i$. The entire amount of light thrown at any time on two adjacent zones of light-permeable areas is concentrated in these lines of light $i$. The rows of these lines of light $i$ are made to move at uniform speed in the direction of the arrow $r$ across the area of the screen P so that alternately the groups of light-permeable areas G (for the left eyes A) and H (for the right eyes B) are illuminated, while the left eye-pictures and right eye-pictures, respectively, are projected.

It is not necessary that the grid of the condenser lenses Z coincides with the grid of the observation lenses X—Y, but the axes of the condenser lenses Z must have the same geometrical shape as the lines which delimit the zones of the light-permeable areas G—H. The zones of light-permeable areas associated with the left eyes A and with the right eyes B, respectively, do not then correspond to whole observation lenses (rows of lenses) but to sections thereof.

In the embodiment according to Fig. 3 a fan-wise arrangement of conical lenses has been chosen for the grid of condenser lenses Z on the side of the projector, as well as for the distributor grid X—Y on the side of the spectators. One condenser lens Z is associated with each pair of lenses X—Y. Since the lenses of both grids correspond to one another, the center M of the grid of lenses Z and the center N of the grid of lenses X—Y both lie on an axis $m$ which is perpendicular to the projection screen P. The grid X—Y is rigidly connected with the projection screen P and both are stationarily spaced in conjunction with each other. When the grid of condenser lenses Z rotate about the axis $m$ at a constant angular velocity $w$, a group of fan-wise disposed lines of light scans the projection screen at a constant angular velocity.

The projector K is preferably so arranged that its objective lens L also lies in the axis $m$. Thus the lines of light on the lateral edge of the projection screen have the same angular velocity as those in the middle of the projection screen. If the center angle of a condenser lens Z is indicated at $\Phi$, the center angle of an observation lens X or Y is indicated at $\varphi$, and the number of changes of frames per second is $n$ and accordingly the number of film transports per second is $2n$, the angular velocity of the grid of condenser lenses Z is then $$W = 2n\varphi = n\Phi$$

With the usual dimensions of the pictures projected, a circumferential velocity $u$ of a few centimeters per second would result on the largest diameter of the grid of condenser lenses, if the average width of the lenses X—Y is assumed to amount to 2-3 mm.

The angular velocity of the grid Z is chosen so that the required number of changes of frames per second is achieved. The change of frames (feed of the film) takes place any time the lines of light cross from the range of the distributor lenses X into the range of the lenses Y, and vice versa.

If the objective lens of the projector lies above the axis $m$, the width of the lenses X—Y must increase from the center of the fan-wise arrangement towards both sides, in order that the transition of all lines of light from the range of the lenses X into the range of the lenses Y, and vice versa, takes place simultaneously.

When using fan-shaped grids for the projection screen, the rows of seats of the spectators in the audience are also arranged fan-wise in such manner that they converge towards the centers MN of the fans forming the grids. The lines of vision (the light-permeable areas) then do not drop towards the boundaries of the lenses X or Y. Such drop should be avoided since the change of frames takes place simultaneously with the transition of the lines of light through these boundary zones.

In the embodiment according to Fig. 3, the dimensions of the grid of condenser lenses are a multiple of those of the area of the projection screen. The grid of condenser lenses has accordingly the shape of a large wheel.

Fig. 4 shows an improved modification of a considerably more compact design, of which the central portion of the grid of condenser lenses Z and of the associated grid of distributor lenses X—Y is represented. The grid of condenser lenses again undergoes a rotary motion about the center M at a constant angular velocity $w$ by means of a driving gear, as is shown in Figure 6 and described in connection with Figure 6. In the embodiment represented in Fig. 4 the grid of condenser lenses Z is assumed to undergo a quarter turn per second, e. g. 16 changes of frames of each right eye- or left eye-picture per second, e. g. 32 transport steps per second of the film.

The grid of condenser lenses consists in this embodiment of lenses Z curved to form involutes. In the central zone I the arrangement of lenses is entirely dispensed with. The spectators therefore will see the right eye- and the left eye-pictures with both eyes which is, however, of no importance in view of the smallness of this zone. In the zone II, the lenses are arranged radially, of wedge-shaped form. In the zones III and IV the lenses have a practically constant uniform cross section, for example of the form shown in Fig. 2. The position of the lenses and their curvature in the longitudinal direction is determined by the points of intersection of 64 radial grid lines V which divide the concentric grid circles C into 64 equal segments. In order to attain a practically uniform width of the grid rows, the circles C are disposed in the middle zone III at larger radial distances from one another, whereas the distances of the grid circles in the outer zone IV are uniform.

The curves according to which the lenses are curved result from aligning the diagonals connecting the consecutive intersecting points of the grid. It has thus been ascertained that each curved condenser lens Z, after a rotation of the grid through a center angle $\Phi$, assumes the position formerly occupied by the adjacent lens. Upon rotation of the grid through an angle $\Phi$ the line of light generated by a condenser lens accordingly scans the range X—Y that corresponds to a pair of associated right eye- and left eye-pictures. Upon rotation of the grid through the angle $\Phi/2 = \varphi$ the lines of light scan all ranges of the same category of picture, e. g. all X-ranges corresponding to the right eye-pictures, or all Y-ranges corresponding to the left eye-pictures.

The curved lenses X and Y are conveniently formed by aligning spherical lens elements in succession. The curves according to which the lenses X—Y and Z are curved, can be computed in a simple way for any desired number of revolutions of the grid of condenser lenses and for any desired number of changes of frames per second. The rotating disc-shaped grid of lenses Z need not then be materially larger than the projection screen. The groups of light-permeable areas coordinated to the left eyes and to the right eyes, respectively, have to be arranged in steadily curved rows which include acute angles with the concentric circles and divide the latter into equal segments having equal center angles.

In the central zone I conical lenses are used instead of cylindrical lenses, which are to be inclined towards the projection screen in accordance with their focal length.

In order to obtain sharply delimited lines of light one can arrange immediately in front of the projection screen P, a blind 10 (Fig. 5) which rotates with the grid of condenser lenses and leaves only narrow slots open which correspond to the lines of light.

If the seats of the spectators in the audience are so arranged that the light-permeable areas do not drop towards the boundaries of the rows of lenses, these boundaries remain covered by the blind layer. Since the feed of the film takes place any time the lines of light cross the boundaries between the lenses X and Y, the provision of a Geneva cross on the projector can be dispensed with.

When spherical lenses X and Y are used, the light rays starting from the light-permeable areas G and H (Fig. 1) are passed on to the corresponding eyes of individual spectators only and not to whole rows of such eyes. It does not then matter from which direction the light rays from the light-permeable areas are thrown on to the rear face of the observation lens.

Accordingly the translucent projection screen can be replaced by a completely clear screen. The direction of the directly projected beam coming from the projector corresponds only to one of the possible directions of the light rays starting from the light-permeable area in the case of a translucent projection screen.

In the central zone of the projection screen a disc can be arranged which has a higher speed of rotation than the grid of lenses Z in order to attain a better disposition of the lenses X—Y.

In the arrangement according to Fig. 6 the central zone I and the zone II are completely dispensed with by arranging the projection screen P and its associated grid of lenses X—Y in the upper semicircle of the circular disc of the grid of condenser lenses Z having the center M. To rotate the disc Z of the grid of condenser lenses about the center M the periphery of the disc may be provided with teeth $a$. The worm $b$ which engages the teeth $a$ is mounted on the shaft $c$, which is rotated by the motor $m$.

Fig. 7 shows an embodiment wherein a grid is formed of cylindrical condenser lenses Z behind which a grid consisting of spherical, cylindrical or wedge shaped lenses X—Y is arranged. The grid of condenser lenses Z is adapted to undergo a translational movement first in the direction of the arrow P, and after one minute, a return movement in the direction of the arrow P′.

Since cooperation of the two grids (Z and X—Y, respectively) is not required, one may use according to Fig. 8 a grid of curved condenser lenses Z corresponding to those shown in Fig. 4, whereas the grid of observation lenses X—Y may consist of fan-wise arranged conical lenses corresponding to those shown in Fig. 3. The blind layer having light-permeable areas and lying behind the grid of observation lenses consists, however, of curved rows corresponding to the grid of the condenser lenses and also corresponds in shape with the grid of condenser lenses.

If desired, several rows of light-permeable areas in the blind layer can correspond to one row of condenser lenses. The groups of light-permeable areas associated with the left eyes and with the right eyes, respectively, are then grouped together according to sections of observation lenses instead of according to observation lenses (or rows of such lenses). As far as the observation lenses extend over the ranges X—X—X, the light-permeable areas or lines lying behind them are coordinated to the left eyes, and as far as they extend over the ranges Y—Y—Y, to the right eyes of the spectators.

The advantages of such arrangements are:

(a) Independence of the two grids from one another in manufacture.

(b) Possibility of using coarser observation lenses.

(c) Dispensing with expensive spherical lenses.

(d) Fineness of the rows comprising the light-permeable areas (or lines) for the right eye- and left eye-pictures lying in the blind layer only.

(e) Simplicity of obtaining these rows from the grids provided for the reproduction of the right eye- and the left eye-pictures by photographic methods, producing, for example, an auxiliary blind on a photosensitive layer by projecting the light from the projector on it by means of the grid of condenser lenses, while making it undergo a slight movement corresponding to part of the width of a lense.

For the production of the blind, having the light-permeable areas for the reproduction of the pictures, the auxiliary blind is placed between another carrier of a photosensitive layer and the grid of observation lenses. The rows of light-permeable areas on the second photosensitive layer are then obtained by exposing it in an otherwise darkened room to light projected alternately from the loci for the left eyes and for the right eyes of all the spectators, while slowly moving the auxiliary grid in the direction of movement of the condenser lenses, whereby the loci are marked on the photosensitive layer which is to be developed by a conversion process in order to obtain these marked areas as transparent on an opaque blind.

The processes and devices according to the invention as described hereinabove can be applied independently of the feed of the film, if so desired, particularly, if the right eye-pictures and the left eye-pictures are projected simultaneously. In this case the path of rays of the two part-pictures (right eye- and left eye-pictures) is alternately interrupted several times during the projection of a pair of right eye- and left eye-pictures.

The movement of the grid of condenser lenses is effected synchronously with these interruptions at such a rate that any time during the operativeness of the path of rays of the one part picture (right eye- or left eye-picture) the zones of the light-permeable areas for the right eyes of the spectators, and during the operativeness of the path of rays of the other part-picture the zones of the light-permeable areas for the left eyes of the spectators are illuminated, so that in the moment of change of operativeness of the two paths of rays of the part-pictures the loci of the lines of light just cross the boundaries of the zones.

Accordingly, the lines of light, i. e. the axes of the condenser lenses of the moving grid, cross the range of a zone of light-permeable areas for the part-pictures repeatedly while one pair of part-pictures is at a standstill. This has a favorable physiological effect on the eyes of the spectators since disturbances in the run of the film are not then transmitted on to the run of the stereoscopic device.

These repeated interruptions, alternating in time, of the bundles of rays coming from the individual right eye- and left eye-pictures can be effected in the simplest way with the aid of means known in themselves.

Fig. 9 shows an arrangement having a stationary grid Z of condenser lenses which can be used when two separate films of right eye- and left eye-pictures are respectively projected by two projectors, or when a single projector is used to throw the right eye- and left eye-pictures from different directions on to the projection screen via interposed deflection mirrors.

For this purpose a grid Z of horizontal cylindrical lenses is arranged on the side of the projector, and a grid of vertical cylindrical lenses X or of lenses having cylindrical or conical shape in fan-wise disposition is arranged on the side of the spectators. Between the grids X and Z there is arranged a translucent projection screen P covered by a grid F on which light-permeable areas G (for the left eyes A) and H (for the right eyes B of the spectators) alternate with opaque areas D in such manner that the rays projecting a left eye-picture can reach the left eyes only of the spectators, and the rays projecting a right eye-picture, their right eyes only.

Each lens of the grid X can be coordinated with several pairs of rows of the grid F which correspond to the several rows of spectators.

With each lens of the grid Z several pairs of rows of the grid F can be coordinated if a corresponding number of projectors is provided, so that several pairs of associated right eye- and left eye-pictures can be projected.

In Fig. 10 the lenses X—Y of the stationary grid of condenser lenses C concentrate the light of the part-picture (right eye- and left eye-picture) rows in the stationary lines of light $x$ and $y$ on the translucent projection screen P which is covered by an opaque blind layer Q. A second blind layer U, having the openings G and H for the lines of sight is provided on a clear support T and coordinates the lines of sight with the eyes A and B, respectively, of the spectators.

The group of lines of light and therefore also the group of lines of sight are preferably of fan-shape. Condenser lenses are made with a conical or cylindrical shape.

According to Fig. 11 the left eye- and right eye-pictures L, R are projected alternately from the rear by means of rows of spherical lenses X and Y, respectively, so that dotted rows of elements of pictures appear on the translucent projection screen P. The blind layer Q covers the projection screen except for the openings corresponding to the picture areas $x'$ and $y'$, respectively.

At a distance $q$ a second blind layer Q' is arranged in front of blind layer Q. Layer Q' has small openings $a$ and $b$ in the direction of the individual spectators having eyes A and B, which are arranged in such manner that the openings $a$ correspond to the picture areas $x'$ and to the left eyes A, whereas the openings $b$ correspond to the picture areas $y'$ and to the right eyes B of the spectators.

The blind layers Q and Q' can be produced in a purely photographic way, depending on the lenses X—Y.

The distance of the blind layer Q from the grid of lenses X—Y corresponds exactly to the focal length $f$ of these lenses. When the grid is illuminated from the side of the projector, the areas $x'$ and $y'$ are exposed to light. A photosensitive layer which is to become the second blind layer Q' is arranged on the same carrier. The carrier plate is mounted inversely so that the side Q faces the spectators. The rows $y'$—$y'$ are then covered and the plate is illuminated by light sources which are arranged at the loci of the right eyes B of the spectators. Then the rows $x'$—$x'$ are covered, and the plate is exposed a second time to light, this time from the loci of the left eyes A of the spectators. Thus the openings $a$ and $b$ are located purely photographically when the seats of the spectators in the audience are arranged symmetrically to the axis of projection. After developing the layer in a conversion process and mounting the carrier plate with the layer Q' facing the spectators, and constructing the projection screen, preferably in the form of a translucent cover or coating on the side Q, the manufacture of the observation device is finished.

While I have described several suitable embodiments of the process, of a device adapted to carry out such process, and of a method for producing operational blinds for such device, I wish it to be understood, that these embodiments have been shown in the drawings and described in the specification merely by way of example and not of limitation. Modifications may offer themselves to those skilled in the art, and as far as such modifications fall within the scope of the appended claims, I wish to have them considered as part of my invention.

What I claim as my invention and desire to secure by Letters Patent, is:

1. A device for the three-dimensional relief effect reproduction of stereoscopically taken right- and left eye-pictures by means of non-polarised light on a two-dimensional screen comprising in combination a movable grid of condenser lenses arranged for being projected upon from the rear alternately with right eye- and left eye-pictures, a translucent stationary screen arranged in front of the said movable grid at a distance equal to the focal length of said condenser lenses, an opaque blind in front of the said screen having separate zones of light permeable spots alternating with one another in the direction of movement of the said movable grid, driving means for moving the said movable grid in phase with the alternations of the right eye- and left eye-pictures and at a speed coordinated to the pitch of the said alternating zones of light permeable spots illuminating the said zones by the light from the said right eye- and left eye-pictures respectively, and a stationary grid of observation lenses arranged in front of the said blind for directing the light from the said zones of light permeable spots to the loci of the right eyes only, and of the left eyes only, respectively, of the spectators.

2. A device for the three-dimensional relief effect reproduction of stereoscopically taken right eye- and left eye-pictures by means of non-polarised light on a two-dimensional screen comprising in combination a circular grid of condenser lenses arranged for rotary movement in a plane parallel to the said screen and for being projected upon from the rear alternately with right eye- and left eye-pictures, a translucent stationary screen arranged in front of the said movable grid at a distance equal to the focal length of said condenser lenses, an opaque blind in front of the said screen having separate zones of light permeable spots alternating with one another in the direction of movement of the said movable grid, driving means for moving the said movable grid in phase with the alternations of the right eye- and left eye-pictures and at a speed coordinated to the pitch of the said alternating zones of light permeable spots illuminating the said zones by the light from the said right eye- and left eye-pictures respectively and a stationary grid of observation lenses arranged in front of the said blind for directing the light from the said zones of light permeable spots to the loci of the right eyes only, and of the left eyes only, respectively, of the spectators.

3. A device as claimed in claim 2, comprising a circular grid of conical condenser lenses having a common apex in the centre of the circular grid arranged for rotary movement in a plane parallel to the said screen.

4. A device as claimed in claim 2, comprising a circular grid of conical condenser lenses having a common apex in the centre of the circular grid arranged for rotary movement in a plane parallel to the said screen and a stationary grid of conical observation lenses having a common apex, the apices of both grids lying on the axis of rotation of the grid of condenser lenses.

5. A device for the three-dimensional relief effect reproduction of stereoscopically taken right eye- and left eye-pictures by means of non-polarised light on a two-dimensional screen comprising in combination a circular grid of condenser lenses arranged for rotary movement in a plane parallel to the said screen the said condenser lenses having steadily curved centre lines arranged for intersecting concentrical circles at equal acute angles and dividing them into equal segments for being projected upon from the rear alternately with right eye- and left eye-pictures, a translucent stationary screen arranged in front of the said movable grid at a distance equal to the focal length of said condenser lenses, an opaque blind in front of the said screen having separate zones of light permeable spots alternating with one another in the direction of movement of the said movable grid, driving means for moving the said movable grid in phase with the alternations of the right eye- and left eye-pictures and at a speed coordinated to the pitch of the said alternating zones of light permeable spots illuminating the said zones by the light from the said right eye- and left eye-pictures respectively and a stationary grid of observation lenses arranged in front of the said blind for directing the light from the said zones of light permeable spots to the loci of the right eyes only, and of the left eyes only, respectively, of the spectators.

6. A device for the three-dimensional relief effect reproduction of stereoscopically taken right eye- and left eye-pictures by means of non-polarised light on a two-dimensional screen comprising in combination a circular grid of condenser lenses arranged for rotary movement in a plane parallel to the said screen the said condenser lenses having steadily curved centre lines arranged for intersecting concentrical circles at equal acute angles and dividing them into equal segments for being projected upon from the rear alternately with right eye- and left eye-pictures, a translucent stationary screen arranged in front of the said movable grid at a distance equal to the focal length of said condenser lenses, an opaque blind in front of the said screen having separate zones of light permeable spots alternating with one another in the direction of movement of the said movable grid, driving means for moving the said movable grid in phase with the alternations of the right eye- and left eye-pictures and at a speed coordinated to the pitch of the said alternating zones of light permeable spots illuminating the said zones by the light from the said right eye- and left eye-pictures respectively and a stationary circular grid of observation lenses having steadily curved centre lines arranged for intersecting concentrical circles at the same acute angles as the curved centre lines of the rotating grid of condenser lenses and dividing them into equal segments the said grid of observation lenses arranged in front of the said blind for directing the light from the said zones of light permeable spots to the loci of the right eyes only, and of the left eyes only, respectively, of the spectators.

JOHANN FRANZ STIPEK.

References Cited in the file of this patent

UNITED STATES PATENTS

| Number | Name | Date |
|---|---|---|
| 1,814,701 | Ives | July 14, 1931 |
| 2,012,995 | Ives | Sept. 3, 1935 |
| 2,029,300 | Arfsten | Feb. 4, 1936 |
| 2,051,586 | Grinten | Aug. 18, 1936 |
| 2,075,853 | Kanolt | Apr. 6, 1937 |
| 2,095,015 | Kujawa | Oct. 5, 1937 |
| 2,100,634 | Coffey | Nov. 30, 1937 |
| 2,131,974 | Genies | Oct. 4, 1938 |
| 2,338,654 | MacNeille | Jan. 4, 1944 |
| 2,351,033 | Gabor | June 13, 1944 |
| 2,441,674 | Savage | May 18, 1948 |
| 2,478,443 | Yule et al. | Aug. 9, 1949 |

FOREIGN PATENTS

| Number | Country | Date |
|---|---|---|
| 822,404 | France | Dec. 30, 1937 |